United States Patent [19]

Buluschek

[11] Patent Number: 4,756,339
[45] Date of Patent: Jul. 12, 1988

[54] HOSE FOR DRIP IRRIGATION AND METHOD OF PRODUCING SAME

[75] Inventor: Bruno Buluschek, Echandens, Switzerland

[73] Assignee: Maillefer SA, Ecublens, Switzerland

[21] Appl. No.: 35,359

[22] Filed: Apr. 7, 1987

[30] Foreign Application Priority Data

Apr. 11, 1986 [CH] Switzerland .................. 1454/86

[51] Int. Cl.⁴ ............................................. B05B 15/00
[52] U.S. Cl. ...................................... 138/115; 239/542
[58] Field of Search ............... 138/115, 116, 114, 113, 138/148, 42, 37, 111; 239/542, 547, 533.1, 745, 554, 556, DIG. 12

[56] References Cited

U.S. PATENT DOCUMENTS 3,777,987 12/1973 Allport .................. 239/542
3,887,138 6/1975 Gilead .................. 239/542
4,022,384 5/1977 Hoyle et al. .................. 239/542
4,053,109 10/1977 Gilead .................. 239/542

FOREIGN PATENT DOCUMENTS

16658/70 12/1971 Australia .................. 239/542
0069487 1/1983 European Pat. Off. .
0091059 10/1983 European Pat. Off. .
2635606 2/1978 Fed. Rep. of Germany ...... 239/547
2386983 11/1978 France .
2409795 6/1979 France .

Primary Examiner—Henry J. Recla
Assistant Examiner—L. J. Peters
Attorney, Agent, or Firm—Parkhurst & Oliff

[57] ABSTRACT

The irrigation hose comprises two tubes disposed one within the other, at least one of the tubes being grooved. The ungrooved tube forms with the groove or grooves of the other tube continuous secondary ducts over the entire length of the hose. Inlet ports and outlet ports delimit in the secondary ducts sections of a predetermined length, each yielding a flow capable of continuously drip-irrigating a plant in the area to be irrigated. The outlet ports and the inlet ports are distributed along spiral lines if the secondary ducts are straight and along straight lines constituting generatrices of the hose if the secondary ducts run along spirals.

9 Claims, 4 Drawing Sheets

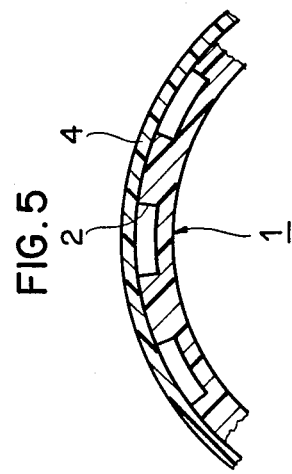
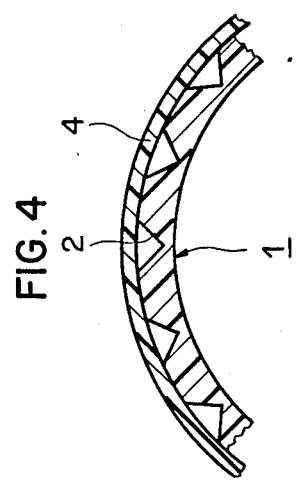
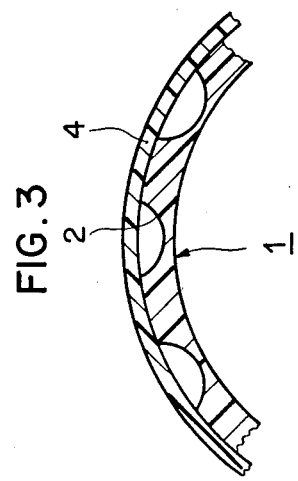
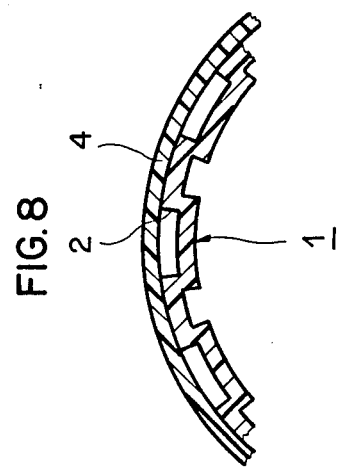
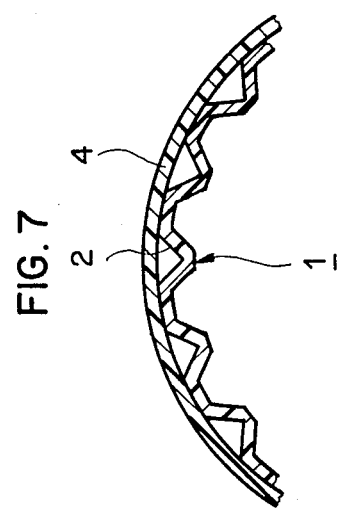
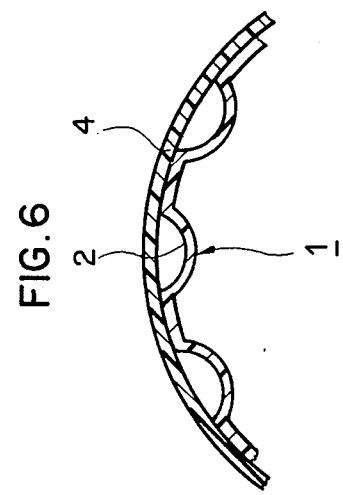

HOSE FOR DRIP IRRIGATION AND METHOD OF PRODUCING SAME

BACKGROUND AND SUMMARY OF THE INVENTION

This invention relates to irrigation equipment, and more particularly to a hose for drip or trickle irrigation, of the type having a primary duct of large cross-section, at least one secondary duct of small cross-section, and inlet and outlet ports causing the primary duct to communicate with each secondary duct, on the one hand, and the latter to communicate with the outside, on the other hand. The invention further relates to a method and an installation for producing such a hose.

Drip irrigation is a method of cultivation which is finding increasingly widespread application in countries desirous of boosting their agricultural or horticultural output. In this method, specially designed hoses are placed in the cultivated areas in such a way that they can be continuously supplied with water under pressure and can, in turn, supply a trickle of water at the base of each plant. Hoses must thus be placed along each row of plants so that a nozzle allowing water to drip out is situated close to each plant. Hence these nozzles must be distributed along the hoses at distances corresponding to the spacing between the plants. In general, such hoses are of plastic and can thus be wound up on reels or revolving stands when not in use. Some examples of the prior art are found in the published French Patent Application Nos. 2,409,795 and 2,386,983, as well as in European Patent Application Publication Nos. 0 091 059 and 0 069 487, all of which describe various designs of such irrigation hoses.

It is an object of this invention to provide an improved drip irrigation hose in which the rate of flow from each outlet port can be precisely predetermined.

A further object of this invention is to provide a drip irrigation hose having outlet ports spaced along the hose at intervals corresponding to the distance between the plants to be irrigated so that the water will flow directly toward each plant.

Another object of this invention is to provide a drip irrigation hose by means of which the rate of flow from each port is so regulated that each plant receives substantially the same amount of water.

To this end, the hose according to the present invention comprises a first tube constituting the primary duct and a second tube extending around the primary duct to form an outer covering, at least one of the tubes including at least one longitudinal groove capable of delimiting, with the other tube, a secondary duct, the first tube including inlet ports disposed at intervals and opening into the secondary duct or ducts, and the outer covering including, disposed at intervals, outlet ports from the secondary duct or ducts interposed between the inlet ports.

Still another object of this invention is to provide an improved method of producing drip irrigation hoses more rapidly, more reliably, and considerably more economically than has heretofore been possible, as well as an installation for carrying out such a method.

To this end, in the method according to the present invention, a first tube and a second tube are continuously formed at different locations, the first tube is brought to the formation location of the second tube, the latter is formed about the former, the first tube is perforated at a location situated between the formation locations of the tubes, and the second tube is perforated at a location situated downstream from the formation locations of both tubes.

The installation according to the present invention comprises two extruders provided with a first and a second extrusion head, respectively, and arranged to produce a first tube and a second tube, respectively, the latter surrounding the former, means for guiding the first tube toward the second extrusion head, means disposed between the two extrusion heads for perforating the first tube, and means disposed downstream from the second extrusion head for perforating the second tube.

DETAILED DESCRIPTION OF THE PREFERRED EMBODIMENTS

Preferred embodiments of the invention will now be described in detail with reference to the accompanying drawings, in which.

Figure 1:
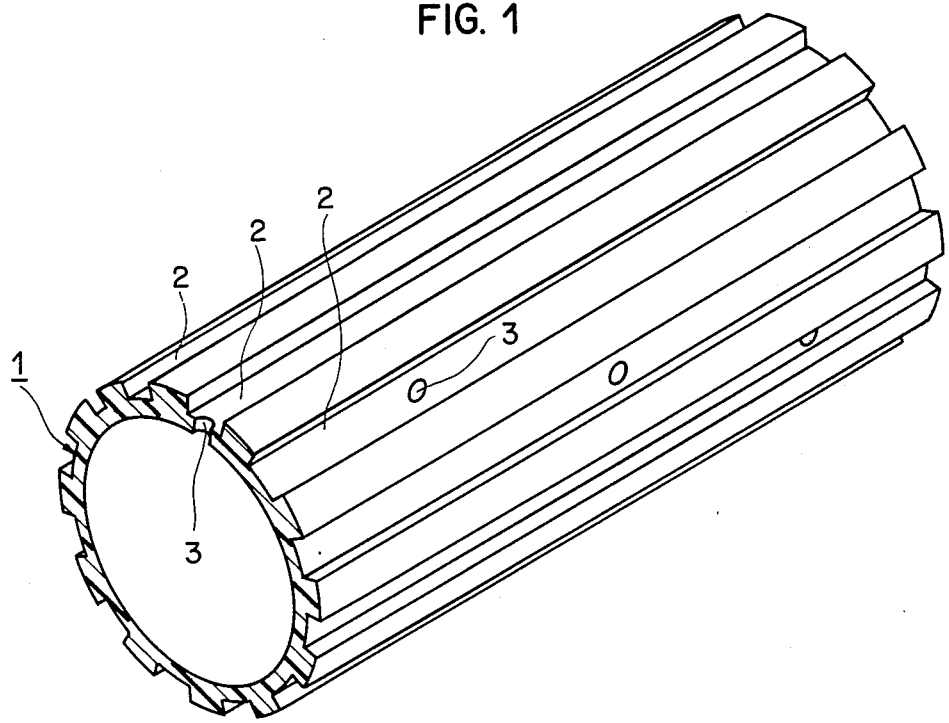
FIG. 1 is a perspective view of a length of a basic tube.
Figure 2:
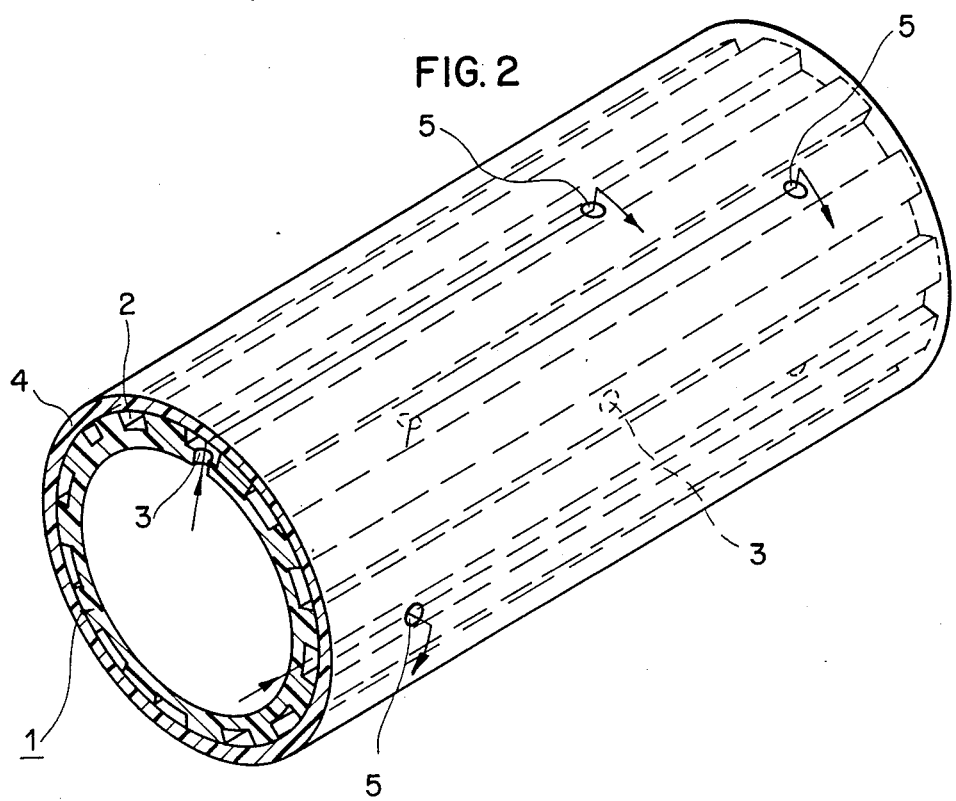
FIG. 2 is a perspective view of a length of irrigation hose utilizing the basic tube of FIG. 1, FIGS. 3 to 8 are partial sectional views showing various embodiments of the irrigation hose.

FIGS. 1 and 2 illustrate the principle of the first embodiment to be described. A basic tube 1 is formed by extrusion in a conventional extrusion head. As may be seen, the tube 1 has a cylindrical inside surface and a series of longitudinal grooves 2 of identical rectangular cross-section distributed over its entire circumference. The grooves 2 extend along the entire length of the tube 1, parallel to the longitudinal axis thereof. At intervals along the bottom of each groove 2 there are inlet ports 3 staggered from one groove to the next by a distance corresponding to the spacing between the plants to be irrigated. The various inlet ports 3 are thus disposed along a line spiralling around the tube 1. The pitch of this spiral corresponds to the distance between two inlet ports 3 in the same groove 2. If n is the number of grooves around the circumference of the basic tube and m is the distance between two adjacent plants, the distance between two inlet ports 3 in the same groove will be $n \times m$.

As shown in FIG. 2, the irrigation hose is finished by disposing around the basic tube 1 an outer covering 4, also formed by extrusion over the basic tube 1 after perforating of the inlet ports 3. In the embodiment shown, the outer covering 4 is a cylindrical covering of uniform thickness which is joined, virtually by fusion at the moment of the extrusion, to the ribs of the tube 1 which separate the grooves 2. As may also be seen in FIG. 2, outlet ports 5 are contrived in the outer covering 4. In the embodiment illustrated, each of the outlet ports 5 is situated at a certain distance, predetermined and constant for all the outlet ports, from one of the inlet ports 3 situated in the same groove 2. Hence there is the same spacing between the successive outlet ports 5 as between the inlet ports 3, this spacing being equal to the distance m, for example, and it will be seen that in each longitudinal strip of the outer covering 4 which closes one of the grooves 2, there are outlet ports 5 spaced by a distance equal to n×m. The water circulating within the primary duct will therefore enter through the ports 3 into the secondary ducts consisting of the different grooves 2 and, after having flowed a certain way corresponding to a certain fraction of the distance n×m, will arrive at the nearest outlet port 5 situated in the same secondary duct and there exit to water a plant.

The important point in the dimensioning of the hose is that the cross-section and length of each secondary duct can be determined by means of absolutely conventional calculations as a function of the water pressure in the primary duct and the desired rate of flow. The proposed irrigation system makes use of the fact that the flow into the secondary ducts will be laminar, so that the loss of head may be calculated in terms of the hydraulic diameter of the secondary duct and of its length. For the cross-section of a secondary duct, there exists a lower limit governed by the type of operation, i.e., the quality of the water used and its degree of pollution, particularly its algae content. The cross-section of the secondary ducts being thus determined, it is possible to calculate the length necessary for obtaining the desired flow through the outlet port. In other words, the flow is not regulated by either the size of the outlet ports nor by that of the inlet ports, so that these ports may be made large enough to avoid any risk of their being clogged by the impurities which may be carried along. This circumstance also facilitates manufacture, as will be seen below.

Returning to the calculation of flow, it will be noted that the maximum length of a secondary duct is subject to a limit which is a function of the distance n×m. For if the hose is provided with n secondary ducts, every nth plant will be supplied by the same secondary duct, and the distance between two successive outlet ports of the same secondary duct will be n×m. For example, if the distance m between two plants is 0.8 meters and the number n of secondary ducts is 10, the distance between two successive outlet ports in the same secondary duct will be n×m=8 meters.

The distance travelled by the water in each secondary duct will be equal to a fraction f×n×m of that distance, the factor f equalling 0.5 or a value less than that limit.

FIGS. 3 to 8 show different forms of a basic tube 1 provided with longitudinal grooves 2 and completed by an outer covering 4 of uniform thickness closing the different grooves 2 toward the outside. It will be seen that in FIGS. 3, 4, and 5, the grooves are arcuate, triangular, and rectangular, respectively. In these three embodiments, the basic tube 1 has a cylindrical inside surface, whereas in the embodiments of FIGS. 6, 7, and 8, although there are the same arcuate, triangular, and rectangular shapes for the cross-sections of the grooves 2, the inside surface of the basic tube 1 is complementary to the outside surface so that the wall thickness of the tube remains uniform, which is not the case in the embodiments of FIGS. 3, 4, and 5.

Figure 9:
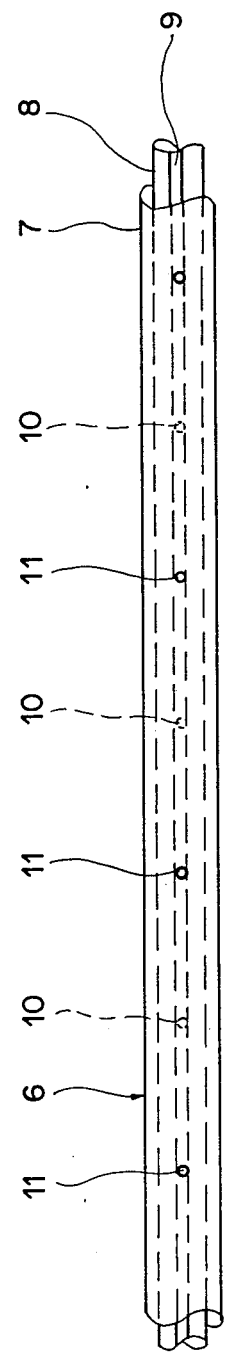
FIGS. 9 and 10 are top plan views of two embodiments of the irrigation hose.
Figure 10:
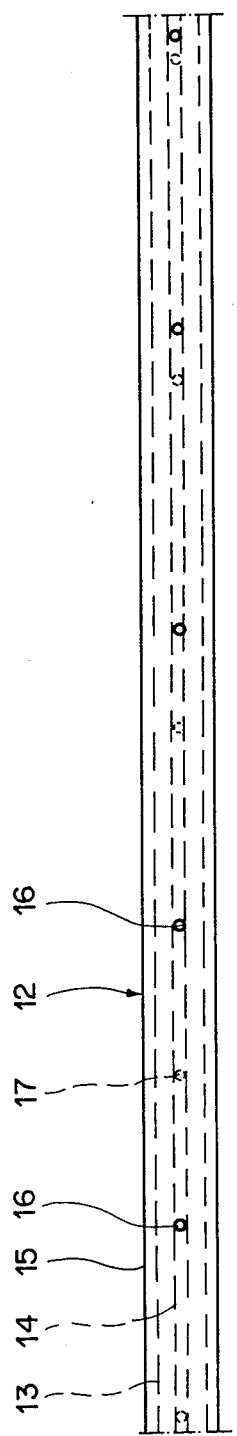

FIGS. 9 and 10, on the other hand, illustrate two other possible embodiments as far as the ratio between the length of the secondary ducts and the distance n×m between two outlet ports is concerned. FIG. 9 shows an irrigation hose 6 comprising an outer covering 7 and a basic tube 8. This basic tube has a single groove 9. The inlet ports 10 are made at intervals in the bottom of the groove 9, while outlet ports 11 are likewise made opposite the groove 9 in the outer covering 7. The distance between two successive ports 11 is, in this case, equal to m, i.e., to the distance between the plants, since here the number n is 1. Moreover, the distance between the ports 10 also equals m, and each port 10 is placed at an equal distance between two successive ports 11. The factor f therefore equals 0.5.

Illustrated in FIG. 10 is an irrigation hose 12 having a basic tube 13 with a single groove 14 and a cylindrical tube of uniform thickness as an outer covering 15. Outlet ports 16 are made in the outer covering 15 at intervals equal to m, while the distance between successive inlet ports 17 is slightly more than m. In this case, during continuous manufacture of the hose 12, care must be taken to cut it into successive sections of a predetermined length, as is seen in FIG. 10. This drawing figure shows a hose with the proportions greatly exaggerated; but it will be noted that at the inlet end of the hose, the secondary ducts are relatively long and gradually become shorter until their length is virtually nil at the outlet end. In other words, the factor f which determines the length of the secondary ducts gradually decreases from the inlet end of the hose to the outlet end. Thus, assuming that the total length of the finished hose is known, it is clear that the losses of head in the primary duct can be taken into account during manufacture in order to ensure a totally constant flow at the various outlet ports 16. The gradually increasing loss of head in the primary duct is compensated for by the shortening of the secondary ducts, obtained in this embodiment in that the inlet ports 17 of each secondary duct gradually approach the corresponding outlet ports 16.

It will also be noted that in other embodiments (not shown), the alignment of the grooves 2, 9, or 13, instead of being straight and parallel to the generatrices of the hose, might equally well run along a spiral, so that all the outlet ports would be disposed along the same generatrix instead of being distributed along a spiral as in FIG. 2.

Figure 11:
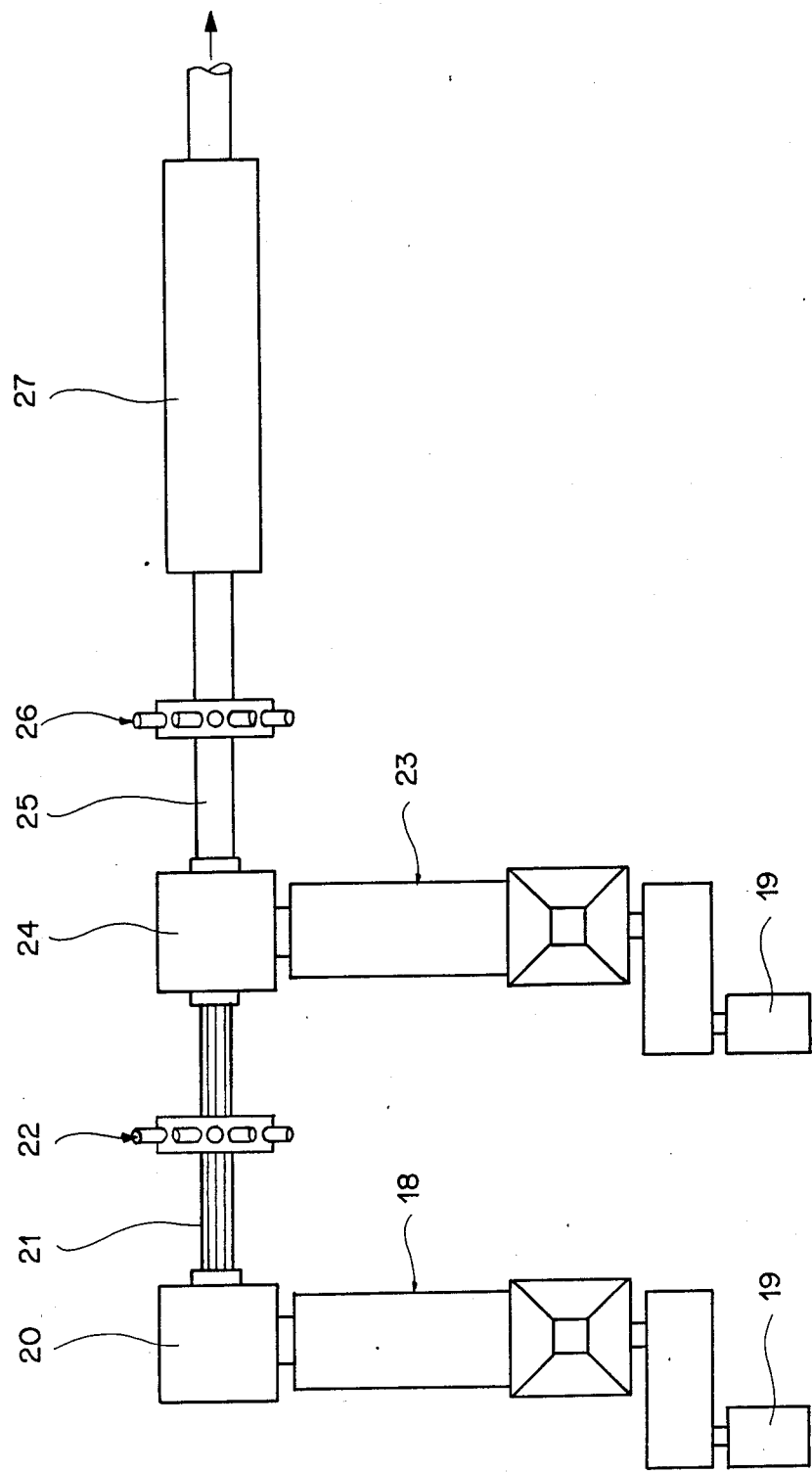
FIG. 11 is a diagrammatic top plan view of an extrusion installation for carrying out the method of manufacture.

An irrigation hose such as described above may be produced by extrusion by means of an installation comprising, in principle, the elements shown in FIG. 11. A first extruder 18 of a conventional type is driven by a motor 19 and feeds an extrusion head 20 yielding a basic tube 21. Disposed downstream from the extrusion head 20 is a perforating arrangement 22 which may, for example, comprise heated pins controlled so as to move radially and produce the inlet ports 3 in the bottom of the grooves 2 in the tube 21. Such pins may be controlled by any suitable means, which need not be described in detail here. As stated above, the dimensions of the inlet ports need not necessarily be very precise, so that the design of the perforating arrangement 22 poses no particular problem. For instance, the ports may be produced by drilling or by milling, by sawing or by punching. A cold tool or a hot tool may be used. The ports may be made while the material is still soft, i.e., as it leaves the extrusion head. As a variation, however, the ports might equally well be made after the material has cooled. If need be, a vat may be placed between the head 20 and the perforating arrangement 22.

A second extruder 23 feeds a second extrusion head 24 which forms an outer covering 25 on the basic tube 21 passing through it. A second perforating arrangement 26 is disposed after the extrusion head 24 and forms at the desired locations the outlet ports 5 seen in FIG. 2. Finally, in the embodiment shown in FIG. 11, the finished hose passes through a cooling vat 27. However, as stated above, an intermediate vat might also be provided, either before or after the arrangement 22. It has been found that the basic tube may be made of reinforced PVC and the outer covering of a polyethylene, e.g., a product resistant to ultraviolet rays and to wear and tear by friction and having good mechanical strength. As for the outlet ports 5, here, too, the shape, size, and positioning are not critical. On the other hand, the outlet ports and the inlet ports must be synchronized, as well as the positions of the different ports in the basic tube and in the outer covering. When the grooves forming the secondary ducts run in a spiral instead of straight, these grooves may be formed by means of a head 20 mounted rotatingly. In that case, the perforating arrangements might comprise only one perforating tool rather than a number corresponding to the number of secondary ducts, as in the devices 22 and 26.

By means of the method described, it is possible to obtain simply, rapidly, and at minimum cost a very reliable drip irrigation hose giving complete operating satisfaction. In this design, there are no detachable, cemented, or welded parts for limiting the rate of flow or for pressure compensation. Limitation of the flow in each secondary duct is effected by determining the cross-section of the secondary ducts and the distance the water must travel between an inlet port and the closest outlet port. The distance travelled by the water is relatively great considering the cross-section of the duct, so that the flow in the secondary ducts is laminar, and the loss of head can be calculated conventionally as a function of the dimensions. The large number of secondary ducts distributed over the entire circumference of the primary duct makes possible long passages of the water. Compensation for losses of head in the primary duct may be obtained by gradually reducing the length of the secondary ducts, which consequently implies synchronization of the perforating operations during manufacture. Furthermore, it must be ensured that the extruded product is cut into sections of strictly determined length.

For the manufacturing installation, an extruder with two twin screws may be provided instead of two separate extruders. Provision may also be made for a single extrusion head fed from two different extruders, combined with the perforating arrangement and forming the two superposed tubes in the same operation.

What is claimed is:

1. A hose for drip or trickle irrigation, of the type having a primary duct, at least one secondary duct of smaller cross-section than said primary duct, a plurality of inlet ports for causing the primary duct to communicate with each secondary duct, and a plurality of outlet ports for causing each secondary duct to communicate with the outside, wherein the improvement comprises a first tube constituting said primary duct and a second tube disposed around said first tube to form an outer covering, a plurality of longitudinal grooves formed in one of said first tube and said second tube to form with the other of said first and second tubes a plurality of separate non-communicating secondary ducts circumferentially adjacent one another at any circumferential cross-section of the hose, a plurality of spaced inlet ports formed in the first tube and opening into said secondary ducts, and a plurality of outlet ports formed in said second tube and opening out of said secondary ducts.

2. The irrigation hose of claim 1, wherein said first tube and said second tube are joined to one another on each side of each longitudinal groove for closing each secondary duct laterally.

3. The irrigation hose of claim 1, wherein each secondary duct communicates with said primary duct through a plurality of said inlet ports distributed along the said longitudinal groove, and each secondary duct further comprises a plurality of said oulet ports interposed between said inlet ports.

4. The irrigation hose of claim 3, wherein said secondary ducts are continuous over the entire length of said hose and are separate from one another, each of said outlet ports being fed by the nearest of said inlet ports.

5. The irrigation hose of claim 3, wherein said secondary ducts are parallel to the axis of said hose, the successive inlet ports and outlet ports being distributed along lines spiralling about said hose.

6. The irrigation hose of claim 3, wherein said secondary ducts have a spiral alignment about said primary duct, said outlet ports all being situated on the same generatrix of said hose.

7. The irrigation hose of claim 3, wherein the distance between each of said outlet ports and the one of said inlet ports nearest thereto in the same said secondary duct is the same for all of said secondary ducts and over the entire length of said hose.

8. The irrigation hose of claim 3, wherein the distance between each of said outlet ports and the one of said inlet ports nearest thereto in the same said secondary duct gradually decreases along said hose as a function of the loss of head in said primary duct.

9. The irrigation hose of claim 3, wherein said secondary ducts are formed by a plurality of longitudinal grooves of identical cross-section contrived in the outside surface of said first tube, the inside and outside surfaces of said second tube being cylindrical and coaxial.

* * * * *